(12) United States Patent
Lee et al.

(10) Patent No.: US 8,213,264 B2
(45) Date of Patent: Jul. 3, 2012

(54) METHOD AND DEVICE OF MEASURING LOCATION, AND MOVING OBJECT

(75) Inventors: Hyong Euk Lee, Yongin-si (KR); Bho Ram Lee, Seoul (KR); Won-Chul Bang, Seongnam-si (KR); Jae Joon Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 232 days.

(21) Appl. No.: 12/656,024

(22) Filed: Jan. 13, 2010

(65) Prior Publication Data

US 2010/0309752 A1 Dec. 9, 2010

(30) Foreign Application Priority Data

Jun. 8, 2009 (KR) ........................ 10-2009-0050396

(51) Int. Cl.
*G01S 3/80* (2006.01)
*G01S 15/00* (2006.01)

(52) U.S. Cl. .......................................... 367/127; 367/99

(58) Field of Classification Search .................... 367/99, 367/127
See application file for complete search history.

(56) References Cited

U.S. PATENT DOCUMENTS

| | | | | |
|---|---|---|---|---|
| 5,339,259 | A * | 8/1994 | Puma et al. .................... | 702/153 |
| 5,495,427 | A * | 2/1996 | Puma et al. .................... | 367/117 |
| 6,176,837 | B1 * | 1/2001 | Foxlin ........................... | 600/595 |
| 6,409,687 | B1 | 6/2002 | Foxlin | |
| 6,720,876 | B1 * | 4/2004 | Burgess ........................ | 340/568.1 |
| 7,000,469 | B2 | 2/2006 | Foxlin et al. | |
| 2003/0045816 | A1 * | 3/2003 | Foxlin ........................... | 600/595 |
| 2004/0143176 | A1 * | 7/2004 | Foxlin ........................... | 600/395 |
| 2006/0153184 | A1 * | 7/2006 | Kounavis et al. ............. | 370/389 |
| 2007/0240515 | A1 * | 10/2007 | Kessler et al. .................. | 73/597 |
| 2008/0004796 | A1 * | 1/2008 | Schott et al. .................. | 701/201 |
| 2008/0086533 | A1 * | 4/2008 | Neuhauser et al. ........... | 709/206 |

FOREIGN PATENT DOCUMENTS

| | | |
|---|---|---|
| JP | 6-214712 | 8/1994 |
| JP | 7-219703 | 8/1995 |
| JP | 2000-132330 | 5/2000 |
| JP | 2002-132436 | 5/2002 |
| JP | 2002-182841 | 6/2002 |
| JP | 2004-78496 | 3/2004 |
| JP | 2004-102896 | 4/2004 |
| JP | 2004-340882 | 12/2004 |
| JP | 2005-266840 | 9/2005 |
| JP | 2005-316763 | 11/2005 |
| JP | 2007-179507 | 7/2007 |
| JP | 2009-26111 | 2/2009 |
| KR | 10-2000-0026403 | 5/2000 |
| KR | 2000-0026403 | 5/2000 |
| KR | 2003-0093387 | 12/2003 |

(Continued)

*Primary Examiner* — Thomas Tarcza
*Assistant Examiner* — James Hulka
(74) *Attorney, Agent, or Firm* — Staas & Halsey LLP

(57) ABSTRACT

Disclosed is a moving object and a location measuring device and method thereof that may transmit an ultrasound signal to the moving object through a plurality of ultrasound transmitting units, and may estimate a location of the moving object at a current time based on distance information of distances between the moving object and the plurality of ultrasound transmitting units measured based on the transmitted ultrasound, inertia information, and location information of the moving object at a time prior to the current time.

14 Claims, 8 Drawing Sheets

FOREIGN PATENT DOCUMENTS

| | | |
|---|---|---|
| KR | 10-2006-0090329 | 8/2006 |
| KR | 10-2006-0097962 | 9/2006 |
| KR | 10-2006-0110978 | 10/2006 |
| KR | 10-2006-0111167 | 10/2006 |
| KR | 10-2007-0035236 | 3/2007 |
| KR | 10-2009-0027048 | 3/2009 |

* cited by examiner

METHOD AND DEVICE OF MEASURING LOCATION, AND MOVING OBJECT

CROSS-REFERENCE TO RELATED APPLICATIONS

This application claims the benefit of Korean Patent Application No. 10-2009-0050396, filed on Jun. 8, 2009, in the Korean Intellectual Property Office, the disclosure of which is incorporated herein by reference.

BACKGROUND

1. Field

The example embodiments relate to a technique that may measure a location of a moving object by using ultrasound.

2. Description of the Related Art

Recently, there has been increased attention to a technique of measuring a three-dimensional (3D) location of a moving substance or a moving object, as a motion sensing scheme is utilized for a movie, game, and the like.

Examples of a method of estimating or measuring the 3D location of the moving substance or the moving object may include a method using ultrasound.

Ultrasound travels through the air at about 340 m/s. Accordingly, when a time of flight (TOF) of the ultrasound from an ultrasound transmitting unit to the moving object is measured by using a characteristic of the ultrasound, a distance between the ultrasound transmitting unit and the moving object may be calculated.

When distance information of distances between at least three ultrasound transmitting units and the moving object is obtained by using the at least three ultrasound transmitting units, the 3D location of the moving object may be measured by using triangulation based on the distance information.

A speed of the ultrasound is relatively slow. Therefore, when the location of the moving object is measured by a plurality of ultrasound transmitting units, the plurality of ultrasound transmitting units may need to sequentially transmit the ultrasound in consideration of the speed of the ultrasound.

When the plurality of ultrasound transmitting units simultaneously transmit the ultrasound, interference may occur between the transmitted ultrasound signals.

In general, although the plurality of ultrasound transmitting units sequentially transmit ultrasound, the 3D location of the moving object may be relatively accurately measured when the moving object is fixed in a predetermined location. However, when the moving object moves quickly, there may be an error in measuring of the 3D location of the moving object since obtained distance information of distances between the plurality of ultrasound transmitting units and the moving object is not measured at a same point in time.

In general, examples of a method of measuring a location of a moving object by using an ultrasound may include a method using a triangulation through at least three ultrasound transmitting units.

The location measuring method may transmit the ultrasound to the moving object by using at least three ultrasound transmitting units, may obtain distance information of distances between the moving object and the at least three ultrasound transmitting units based on a time in which the moving object receives the ultrasound, and may perform triangulation based on the distance information, thereby calculating a three-dimensional (3D) location of the moving object.

The location measuring method may relatively accurately measure the location, when the moving object is fixed in a predetermined location, whereas the location measuring method may not accurately measure the location when the moving object moves quickly.

When the moving object moves, the distance information of distances between the moving object and the at least three ultrasound transmitting units may not be measured at a same point in time, since the ultrasound is sequentially transmitted from the at least three ultrasound transmitting units.

As an example, the ultrasound in a related art is sequentially transmitted from the at least three ultrasound transmitting units, in an order of an ultrasound transmitting unit 1, an ultrasound transmitting unit 2, and an ultrasound transmitting unit 3.

The assumption is for convenience of description, and the ultrasound may not be necessarily transmitted in the order of the ultrasound transmitting unit 1, the ultrasound transmitting unit 2, and the ultrasound transmitting unit 3. That is, the ultrasound is sequentially transmitted from a plurality of ultrasound transmitting units, and a transmission sequence may be different depending on the circumstances.

Here, it is assumed that the ultrasound transmitting unit 1 transmits the ultrasound to the moving object at a point in time t-2, the ultrasound transmitting unit 2 transmits the ultrasound to the moving object at a point in time t-1, and the ultrasound transmitting unit 3 transmits the ultrasound to the moving object at a point in time t.

To measure a location of the moving object at the point in time t, distance information of a distance between the moving object and the ultrasound transmitting unit 1 of the point in time t, distance information of a distance between the moving object and the ultrasound transmitting unit 2 of the point in time t, and distance information of a distance between the moving object and the ultrasound transmitting unit 3 of the point in time t may be used.

However, the distance information of the distance between the ultrasound transmitting unit 1 and the moving object is distance information of the point in time t-2, the distance information of the distance between the ultrasound transmitting unit 2 and the moving object is distance information of the point in time t-1, and the distance information of the distance between the ultrasound transmitting unit 3 and the moving object is distance information of the point in time t. Accordingly, when the location of the moving object is calculated based on the distance information of the distances, an error may occur.

A method of simultaneously transmitting the ultrasound from the plurality of ultrasound transmitting units may be used to prevent the error. However, interference may occur between the simultaneously transmitted ultrasound signals, and thus, the method is practically unavailable.

Accordingly, there is a need for a method for minimizing the error, when the location of the moving object is measured by the plurality of ultrasound transmitting units.

Accordingly, example embodiments perform, based on an inertial navigation, a time synchronization that converts distance information of distances between the moving object and the ultrasound transmitting units at a point prior to a current point in time into distance information at the current point in time, thereby accurately measuring the location of the moving object at the current point in time.

SUMMARY

Accordingly, it is an aspect of the present invention to provide a method that decreases the error when the location of the moving object is measured by using ultrasound.

Additional aspects and/or advantages will be set forth in part in the description which follows and, in part, will be apparent from the description, or may be learned by practice of the invention.

The foregoing and/or other aspects may be achieved by providing a location measuring device, including a plurality of ultrasound transmitting units to sequentially transmit ultrasound signals to a moving object; a information receiving unit to receive, from the moving object, inertia information related to a movement of the moving object; and a location estimating unit to estimate a location of the moving object at a current time based on the inertia information and location information of the moving object at a time prior to the current time.

The foregoing and/or other aspects may be achieved by providing a moving object, including at least one ultrasound receiving unit to receive ultrasound signals sequentially transmitted from a plurality of ultrasound transmitting units included in a location measuring device, an inertia sensor unit to generate inertia information related to a movement of the moving object, and an information generating unit to generate a plurality of distance information of distances between the moving object and the plurality of ultrasound transmitting units based on the received ultrasound.

The foregoing and/or other aspects are also achieved by providing a method of measuring a location, including sequentially transmitting ultrasound to a moving object by using a plurality of ultrasound transmitting unit, receiving, from the moving object, inertia information related to a movement of the moving object, and estimating a location of the moving object at a current time based on the inertia information and location information of the moving object at a point prior to the current time.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
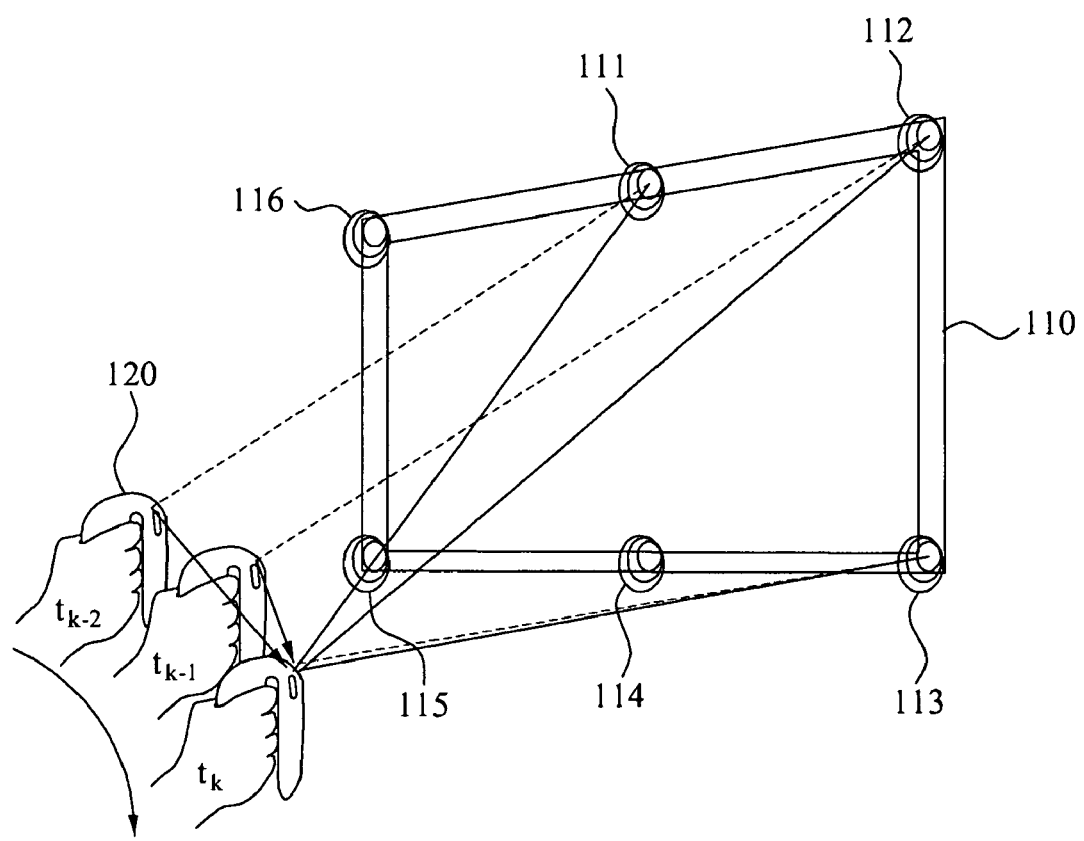
FIG. 1 is a diagram illustrating a location measuring device and a moving object according to the example embodiments of the present invention.

Reference will now be made in detail to example embodiments, examples of which are illustrated in the accompanying drawings, wherein like reference numerals refer to the like elements throughout. Example embodiments are described below to explain the present disclosure by referring to the figures.

Accordingly, hereinafter, example embodiments will be described in detail with reference to FIGS. 1 through 6.

FIG. 1 is a diagram illustrating a location measuring device 110 and a moving object 120 according to example embodiments of the present invention.

Referring to FIG. 1, the location measuring device 110 and the moving object 120 are illustrated.

The location measuring device 110 may include a plurality of ultrasound transmitting units 111, 112, 113, 114, 115, and 116 which sequentially transmit ultrasound signals to the moving object 120.

Although six ultrasound transmitting units 111, 112, 113, 114, 115, and 116 are illustrated in FIG. 1, it is merely an example embodiment and a number of the plurality of ultrasound transmitting units may vary.

When the moving object 120 receives the ultrasound signals from the plurality of ultrasound transmitting units 111, 112, 113, 114, 115, and 116, the moving object 120 may calculate distances between the moving object 120 and the plurality of ultrasound transmitting units 111, 112, 113, 114, 115, and 116 based on an arrival time of the ultrasound, thereby generating distance information.

The location measuring device 110 may receive the distance information from the moving object 120, and may measure a location of the moving object 120 based on the received distance information.

In this instance, the location measuring device 110 may measure the location of the moving object 120 by using a triangulation based on the distance information.

As an example, when the moving object 120 is fixed in a predetermined location, the moving object 120 may receive the ultrasound from the ultrasound transmitting unit (1) 111, the ultrasound transmitting unit (2) 112, and the ultrasound transmitting unit (3) 113, may generate distance information of a distance between the moving object 120 and the ultrasound transmitting unit (1) 111, distance information of a distance between the moving object 120 and the ultrasound transmitting unit (2) 112, and distance information of a distance between the moving object 120 and the ultrasound transmitting unit (3) 113, and the location measuring device 110 may receive the distance information from the moving object 120, and may measure the location of the moving object 120 by using the triangulation.

However, as described above, as the moving object 120 moves, the measured distance information of distances between the moving object 120 and the plurality of ultrasound transmitting units 111, 112, 113, 114, 115, and 116 is not distance information measured at a same point in time. Therefore, the location measuring device 110 may not accurately measure the location of the moving object 120.

Example embodiments describing an operation of the location measuring device 110, when the moving object 120 moves, will be described in detail with reference to FIGS. 2 through 4.

Figure 2:
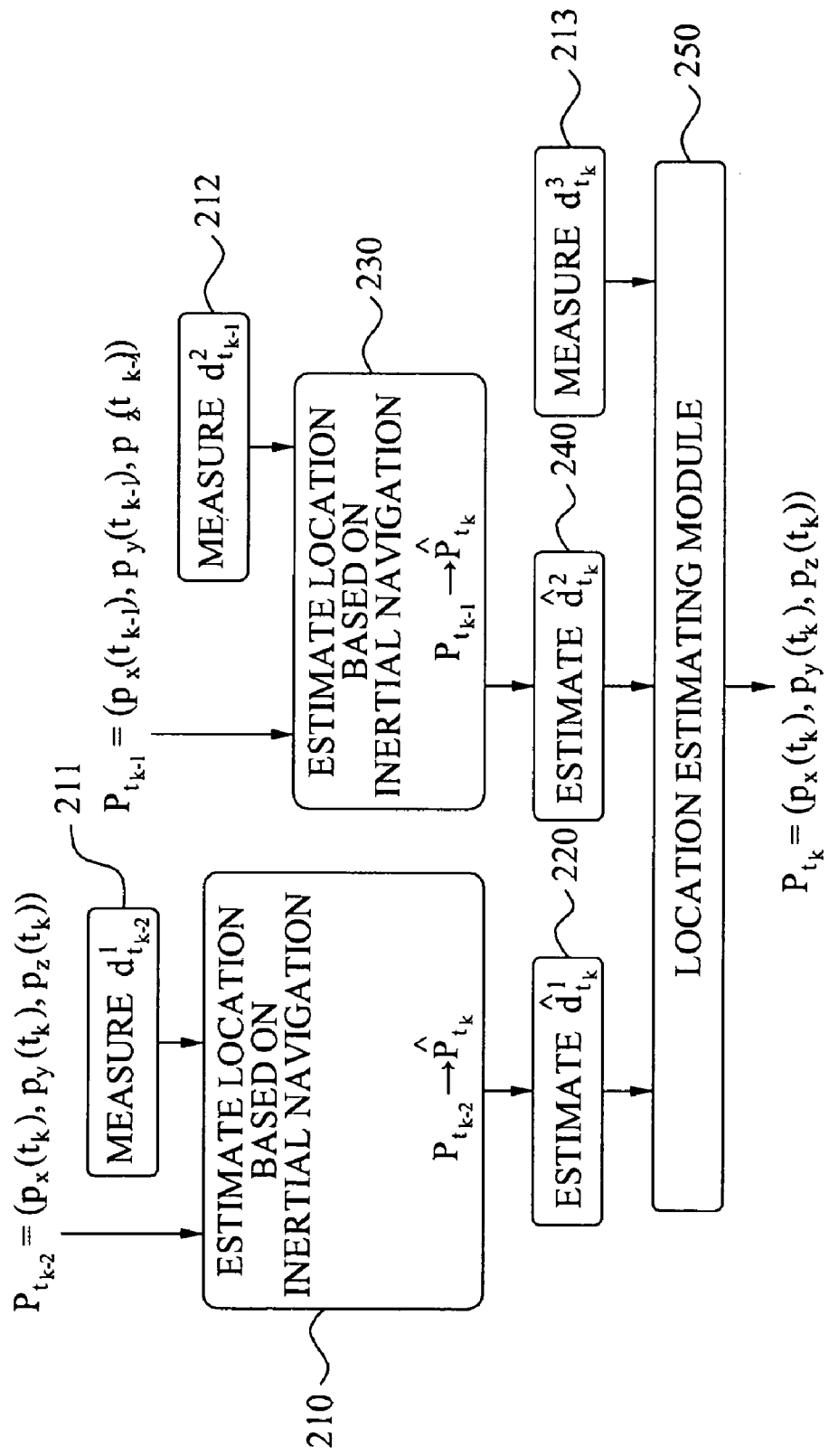
FIG. 2 is a diagram illustrating an operation of a location measuring device according to the example embodiments of the present invention.

FIG. 2 is a diagram illustrating an operation of a location measuring device according to example embodiments For convenience of description, it is assumed that the moving object 120 moves over time, in an order of a point in time $t_{k-2}$, a point in time $t_{k-1}$, and a point in time $t_k$. Hereinafter, an example that the location measuring device 110 measures a location of the moving object 120 at the point in time $t_k$ will be described.

First, it is assumed that the location measuring device 110 already knows location information $P_{t_{k-2}}$ of the moving object 120 at the point in time $t_{k-2}$ and location information $P_{t_{k-1}}$ of the moving object 120 at the point in time $t_{k-1}$.

Also, the ultrasound transmitting unit (1) 111 transmits an ultrasound to the moving object 120 at the point in time $t_{k-2}$, the ultrasound transmitting unit (2) 112 transmits ultrasound to the moving object 120 at the point in time $t_{k-1}$, and the ultrasound transmitting unit (3) 113 transmits ultrasound to the moving object 120 at the point in time $t_{k-3}$.

However, the above description is just for convenience, and the ultrasound signals may not be necessarily transmitted in an order of the ultrasound transmitting unit (1) 111, the ultrasound transmitting unit (2) 112, and the ultrasound transmitting unit (3) 113. That is, although the ultrasound is sequentially transmitted from a plurality of ultrasound transmitting units 111, 112, 113, 114, 115, and 116, a transmission sequence of the ultrasound by the plurality of transmitting units 111, 112, 113, 114, 115, and 116 may be different depending on the circumstances.

The moving object 120, at the point in time $t_{k-2}$, may measure distance information $d_{t_{k-2}}^1$ of a distance between the moving object 120 and the ultrasound transmitting unit (1) 111 based on the ultrasound received from the ultrasound transmitting unit (1) 111 in operation 211, and may transmit the measured distance information to the location measuring device 110.

Also, the moving object 120, at the point in time $t_{k-1}$, may measure information distance $d_{t_{k-1}}^2$ of a distance between the moving object 120 and the ultrasound transmitting unit (2) 112 based on ultrasound received from the ultrasound transmitting unit (2) 112 in operation 212, and may transmit the measured distance information $d_{t_{k-1}}^2$ to the location measuring device 110.

Also, the moving object 120, at the point in time $t_k$, may measure information distance $d_{t_k}^3$ of a distance between the moving object 120 and the ultrasound transmitting unit (3) 113 based on ultrasound received from the ultrasound transmitting unit (3) 113 in operation 213, and may transmit the measured distance information $d_{t_k}^3$ to the location measuring device 110.

The moving object 120 may include an inertial sensor that may sense acceleration, an angular velocity, and the like according to a movement of the moving object 120.

When the moving object 120 moves from at the point in time $t_{k-2}$ to at point in time $t_k$, the inertia sensor included in the moving object 120 may sense the movement of the moving object 120 and may generate inertia information.

In operation 210, the location measuring device 110 may receive the inertia information from the moving object 120, and may estimate location information $\hat{P}_{t_k}$ of the moving object 120 at the point in time $t_k$ from the location information $P_{t_{k-2}}$ of the moving object 120 at the point in time $t_{k-2}$ by using an inertial navigation based on the inertia information.

In operation 220, the location measuring device 110 may convert the distance information $d_{t_{k-2}}^1$ of the distance between the moving object 120 and the ultrasound transmitting unit (1) 111 at the point in time $t_{k-2}$, into distance information $\hat{d}_{t_k}^1$ of the distance between the moving object 120 and the ultrasound transmitting unit (1) 111 at the point in time $t_k$, based on the location information of the moving object 120 estimated in operation 210.

That is, in operation 220, the location measuring device 110 may estimate distance information between the moving object 120 and the ultrasound transmitting unit (1) 111 at the point in time $t_k$ based on the location information of the moving object at the point in time $t_k$ estimated in operation 210.

In operation 230, the location measuring device 110 may estimate the location information $\hat{P}_{t_k}$ of the moving object 120 at the point in time $t_k$ from the location information $P_{t_{k-1}}$ of the moving object 120 at the point in time $t_{k-1}$ by using the inertial navigation based on the inertia information.

In operation 240, the location measuring device 110 may convert the distance information $d_{t_{k-1}}^2$ of the distance between the moving object 120 and the ultrasound transmitting unit (2) 112 at the point in time $t_{k-1}$, into distance information $\hat{d}_{t_k}^2$ of the distance between the moving object 120 and the ultrasound transmitting unit (2) 112 at the point in time $t_k$, based on the location information of the moving object estimated in operation 230.

That is, in operation 240, the location measuring device 110 may estimate the distance information between the moving object 120 and the ultrasound transmitting unit (2) 112 at the point in time $t_k$ based on the location information of the moving object 120 at the point in time $t_k$ estimated in operation 230.

In operation S250, the location measuring device 110 may estimate a location of the moving object 120 at the point in time $t_k$ through a predetermined location measuring module, based on the distance information $\hat{d}_{t_k}^1$, $\hat{d}_{t_k}^2$, and $d_{t_k}^3$. In this instance, the $\hat{d}_{t_k}^1$ is the distance information between the moving object 120 and the ultrasound transmitting unit (1) 111 at the point in time $t_k$ estimated in operation 220, the $\hat{d}_{t_k}^2$ is the distance information between the moving object 120 and the ultrasound transmitting unit (2) 112 at the point in time $t_k$ estimated in operation 240, and the $d_{t_k}^3$ is the distance information between the moving object 120 and the ultrasound transmitting unit (3) 113 and is received from the moving object 120 at the point in time $t_k$.

In this instance, the location measuring device 110 may estimate the location of the moving object 120 at the point in time $t_k$ by using the triangulation based on the $\hat{d}_{t_k}^1$, $\hat{d}_{t_k}^2$, and $d_{t_k}^3$.

Accordingly, the location measuring device according to an aspect of the present embodiments may synchronize distance information of distances between the moving object 120 and the plurality of ultrasound transmitting units 111, 112, 113, 114, 115, and 116 at different points in time with distance information at a same point in time, thereby decreasing an error which may occur when the location of the moving object 120 is measured.

Figure 3:
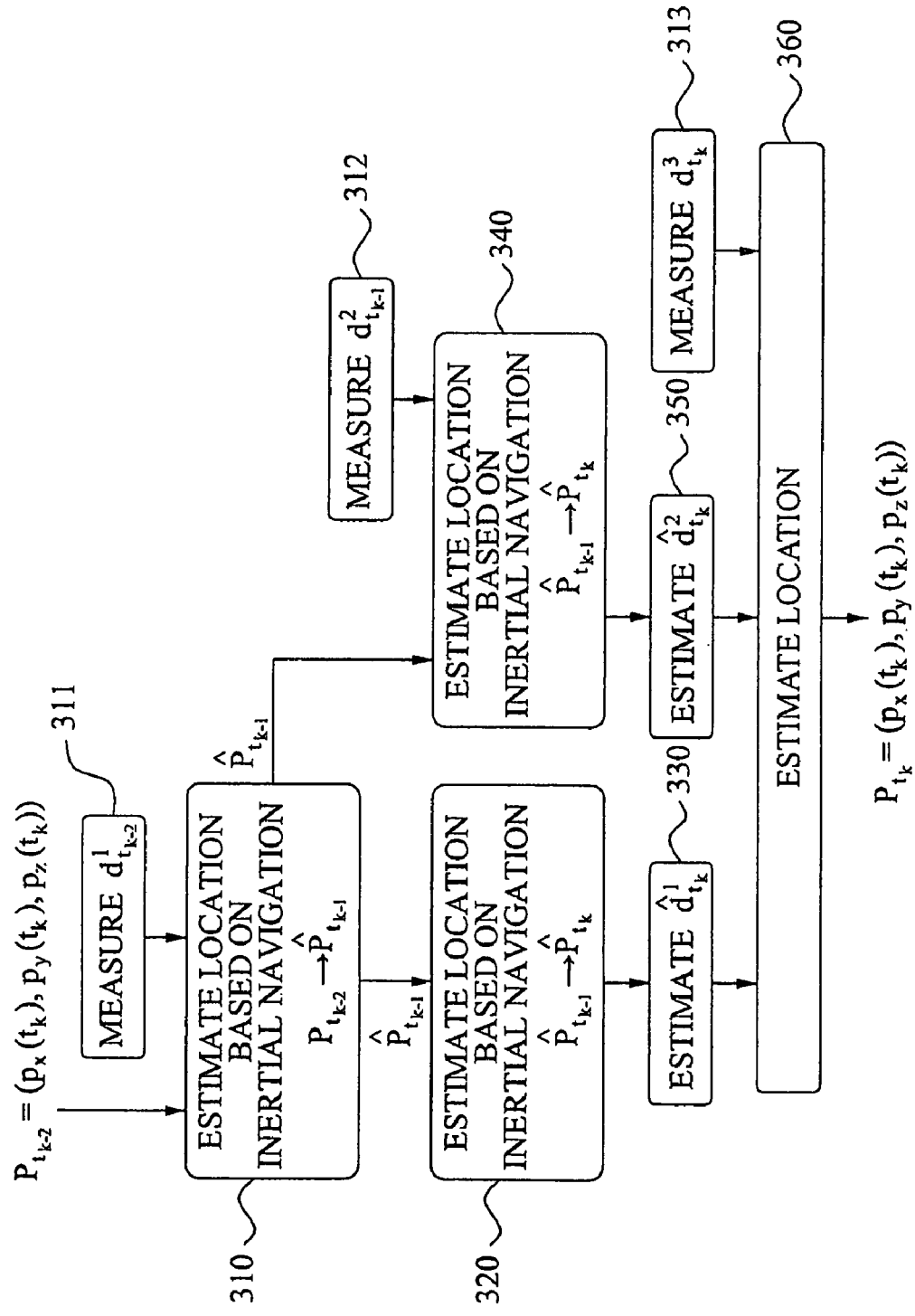
FIG. 3 is a diagram illustrating an operation of a location measuring device according to another example embodiments of the present invention.

FIG. 3 is a diagram illustrating an operation of a location measuring device according to other example embodiments.

Example embodiments of FIG. 3 will be described on the same assumption of the description of FIG. 2.

The moving object 120, at a point in time $t_{k-2}$, may measure distance information $d_{t_{k-2}}^1$ of a distance between the moving object 120 and the ultrasound transmitting unit (1) 111 based on ultrasound received from the ultrasound transmitting unit (1) 111 in operation 311, and may transmit the estimated distance information to the location measuring device 110.

Also, the moving object 120, at a point in time $t_{k-1}$, may measure distance information $d_{t_{k-1}}^2$ of a distance between the moving object 120 and the ultrasound transmitting unit (2) 112 based on ultrasound received from the ultrasound transmitting unit (2) 112 in operation 312, and may transmit the estimated distance information to the location measuring device 110.

Also, the moving object 120, at a point in time $t_k$, may measure distance information $d_{t_k}^3$ of a distance between the moving object 120 and the ultrasound transmitting unit (3)

113 based on ultrasound received from the ultrasound transmitting unit (3) 113 in operation 313, and may transmit the estimated distance information to the location measuring device 110.

When the moving object 120 moves from a location at the point in time $t_{k-2}$ to another location at point in time $t_k$, an inertia sensor included in the moving object 120 may sense a movement of the moving object 120 and may generate inertia information.

In operation 310, the location measuring device 110 may receive the inertia information from the moving object 120, and may estimate location information $\hat{P}_{t_{k-1}}$ of the moving object 120 at the point in time $t_{k-1}$ from location information $P_{t_{k-2}}$ of the moving object 120 at the point in time $t_{k-2}$ by using inertial navigation based on the inertia information.

In operation 320, the location measuring device 110 may estimate location information $\hat{P}_{t_k}$ of the moving object 120 at the point in time $t_k$ from the location information $\hat{P}_{t_{k-1}}$ of the moving object 120 at the point in time $t_{k-1}$ by using the inertial navigation based on the inertia information.

In operation 330, the location measuring device 110 may convert the distance information $d_{t_{k-2}}^{1}$ of the distance between the moving object 120 and the ultrasound transmitting unit (1) 111 at the point in time $t_{k-2}$, into distance information $\hat{d}_{t_k}^{1}$ of the distance between the moving object 120 and the ultrasound transmitting unit (1) 111 at the point in time $t_k$, based on the location information of the moving object 120 estimated in operation 320.

That is, in operation 330, the location measuring device 110 may estimate the distance information of the distance between the moving object 120 and the ultrasound transmitting unit (1) 111 at the point in time $t_k$, based on the location information of the moving object 120 at the point in time $t_k$ estimated in operation 320.

In operation 340, the location measuring device 110 may estimate the location information $\hat{P}_{t_k}$ of the moving object 120 at the point in time $t_k$ from the location information $\hat{P}_{t_{k-1}}$ of the moving object 120 at the point in time $t_{k-1}$ estimated in operation 310 by using the inertia navigation based on the inertial information.

That is, in the example embodiment with reference to FIG. 2, the location information $\hat{P}_{t_k}$ of the moving object 120 at the point in time $t_k$ is estimated from the location information $P_{t_{k-1}}$ of the moving object 120 at the point in time $t_{k-1}$ which is already known by the moving object 120, whereas in the embodiment with reference to FIG. 3, the location information $\hat{P}_{t_k}$ of the moving object 120 at the point in time $t_k$ is estimated from the location information $\hat{P}_{t_{k-1}}$ of the moving object 120 at the point in time $t_{k-1}$ estimated in operation 310.

In operation 350, the location measuring device 110 may convert the distance information $d_{t_{k-1}}^{2}$ of the distance between the moving object 120 and the ultrasound transmitting unit (2) 112 at the point in time $t_{k-1}$, into distance information $\hat{d}_{t_k}^{2}$ of the distance between the moving object 120 and the ultrasound transmitting unit (2) 112 at the point in time $t_k$, based on the location information of the moving object 120 estimated in operation 340.

That is, in the operation 350, the location measuring device 110 may estimate the distance information of the distance between the moving object 120 and the ultrasound transmitting unit (2) 112 at the point in time $t_k$ based on the location information of the moving object 120 at the point in time $t_k$ estimated in operation 340.

In operation 360, the location measuring device 110 may estimate a location of the moving object 120 at the point in time $t_k$ through a predetermined location measuring module included in the location measuring device 110, based on the distance information $\hat{d}_{t_k}^{1}$, $\hat{d}_{t_k}^{2}$, and $d_{t_k}^{3}$. In this instance, the $\hat{d}_{t_k}^{1}$ is the distance information of the distance between the moving object 120 and the ultrasound transmitting unit (1) 111 at the point in time $t_k$ estimated in operation 330, the $\hat{d}_{t_k}^{2}$ is the distance information of the distance between the moving object 120 and the ultrasound transmitting unit (2) 112 at the point in time $t_k$ estimated in operation 350, and the $d_{t_k}^{3}$ is the distance information of the distance between the moving object 120 and the ultrasound transmitting unit (3) 113 at the point in time $t_k$ and is received from the moving object 120 at the point in time $t_k$.

In this instance, the location measuring device 110 may estimate the location of the moving object 120 at the point in time $t_k$ by using a triangulation based on the $\hat{d}_{t_k}^{1}$, $\hat{d}_{t_k}^{2}$, and $d_{t_k}^{3}$.

Figure 4:
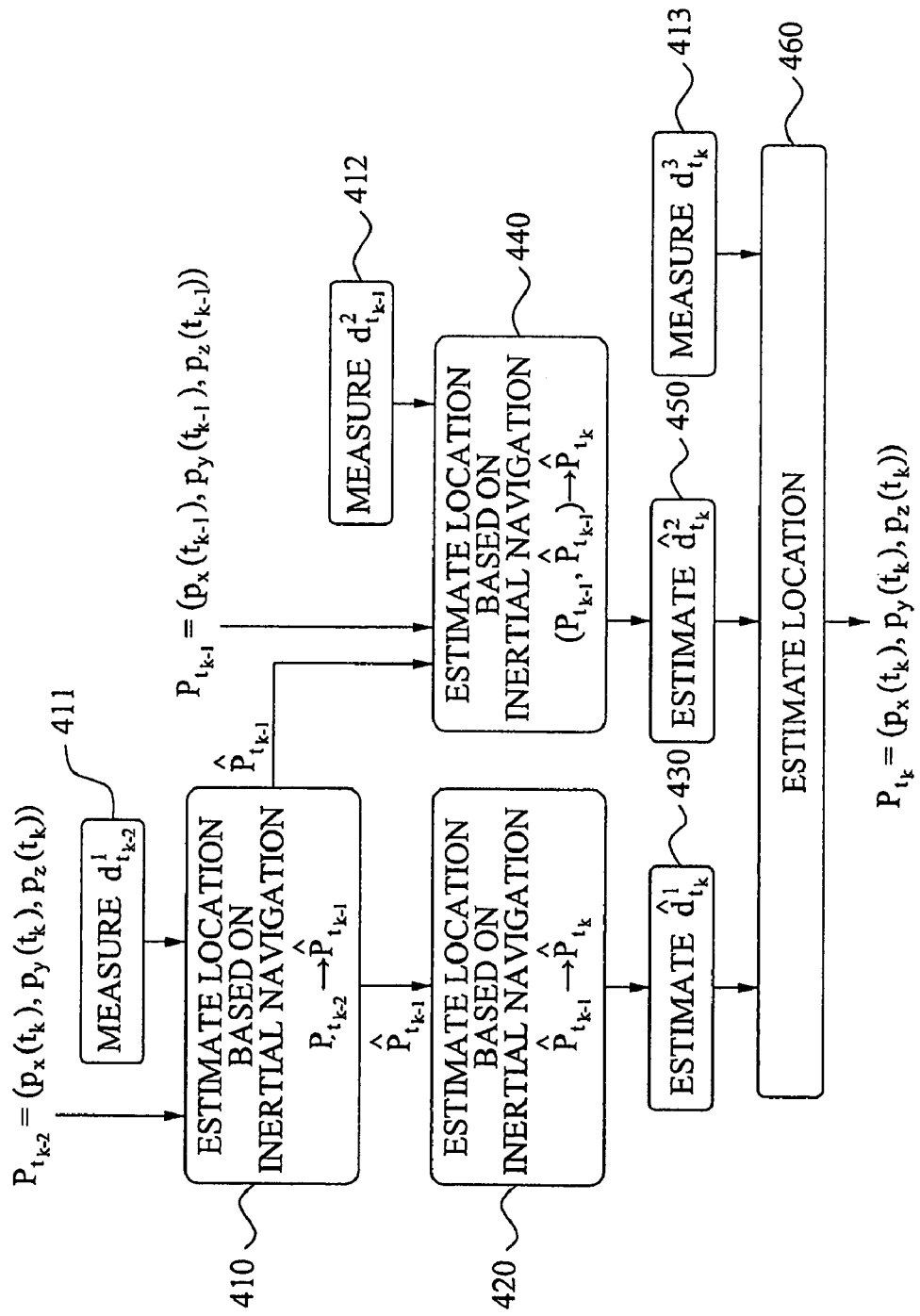
FIG. 4 is a diagram illustrating an operation of a location measuring device according to still other example embodiments of the present invention.

FIG. 4 is a diagram illustrating an operation of a location measuring device according to still other example embodiments Example embodiments of FIG. 4 will be described on the same assumption of the description of FIG. 2.

The moving object 120, at a point in time $t_{k-2}$, may estimate distance information $d_{t_{k-2}}^{1}$ of a distance between the moving object 120 and the ultrasound transmitting unit (1) 111 based on the ultrasound received from the ultrasound transmitting unit (1) 111 in operation 411, and may transmit the measured distance information to the location measuring device 110.

Also, the moving object 120, at a point in time $t_{k-1}$, may estimate distance information $d_{t_{k-1}}^{2}$ of a distance between the moving object 120 and the ultrasound transmitting unit (2) 112 based on the ultrasound received from the ultrasound transmitting unit (2) 112 in operation 412, and may transmit the measured distance information to the location measuring device 110.

Also, the moving object 120, at a point in time $t_k$, may estimate distance information $d_{t_k}^{3}$ of a distance between the moving object 120 and the ultrasound transmitting unit (3) 113 based on the ultrasound received from the ultrasound transmitting unit (3) 113 in operation 413, and may transmit the measured distance information to the location measuring device 110.

When the moving object 120 moves from a location at the point in time $t_{k-2}$ to another location at the point in time $t_k$, an inertia sensor included in the moving object 120 may sense a movement of the moving object 120 and may generate inertia information.

In operation 410, the location measuring device 110 receives the inertia information from the moving object 120, and may estimate location information $\hat{P}_{t_{k-1}}$ of the moving object 120 at the point in time $t_{k-1}$ from the location information $P_{t_{k-2}}$ of moving object 120 at the point in time $t_{k-2}$ by using the inertial navigation based on the inertia information.

In operation 420, the location measuring device 110 may estimate the location information $\hat{P}_{t_k}$ of the moving object 120 at the point in time $t_k$ from the location information $\hat{P}_{t_{k-1}}$ of moving object 120 at the point in time $t_{k-1}$ estimated in operation 410 by using the inertial navigation based on the inertia information.

In operation 430, the location measuring device 110 may convert the distance information $d_{t_{k-2}}^{1}$ of the distance between the moving object 120 and the ultrasound transmitting unit (1) 111 at the point in time $t_{k-2}$, into distance information $\hat{d}_{t_k}^{1}$ of the distance between the moving object 120 and the ultrasound transmitting unit (1) 111 at the point in time $t_k$ based on the location information of the moving object 120 estimated in operation 420.

That is, in operation 430, the location measuring device 110 may estimate the distance information of the distance between the moving object 120 and the ultrasound transmitting unit (1) 111 based on the location information of the moving object 120 at the point in time $t_k$ estimated in operation 420.

In operation 440, the location measuring device 110 may estimate $\hat{P}_{t_k}$ of the moving object 120 at the point in time $t_k$ from the location information $\hat{d}_{t_{k-1}}$ of the moving object 120 at the point in time $t_{k-1}$ estimated in operation 410 by using inertial navigation based on the inertia information and the location information $P_{t_{k-1}}$ of moving object 120 at the point in time $t_{k-1}$ which is already known by the moving object.

That is, in the example embodiment with reference to FIG. 2, the location information $\hat{P}_{t_k}$ of the moving object 120 at the point in time $t_k$ is estimated from the location information $P_{t_{k-1}}$ of the moving object 120 at the point in time $t_{k-1}$ which is already known by the moving object 120, in the embodiment with reference to FIG. 3, the location information $\hat{P}_{t_k}$ of the moving object 120 at the point in time $t_k$ is estimated from the location information $\hat{P}_{t_{k-1}}$ of the moving object 120 at the point in time $t_{k-1}$ estimated in operation 310. However, in the example embodiment with reference to FIG. 4, the location information $\hat{P}_{t_k}$ of moving object 120 at the point in time $t_k$ from the location information $\hat{P}_{t_{k-1}}$ of the moving object 120 at the point in time $t_{k-1}$ estimated in operation 410 and the location information $P_{t_{k-1}}$ of moving object 120 at the point in time $t_{k-1}$ which is already known by the moving object.

In operation 450, the location measuring device 110 may convert the distance information $d_{t_{k-1}}^2$ of the distance between the moving object 120 and the ultrasound transmitting unit (2) 112 at the point in time $t_{k-1}$, into distance information $\hat{d}_{t_k}^2$ of the distance between the moving object 120 and the ultrasound transmitting unit (2) 112 at the point in time $t_k$ based on the location information of the moving object 120 estimated in operation 440.

That is, in the operation 450, the location measuring device 110 may estimate the distance information of the distance between the moving object 120 and the ultrasound transmitting unit (2) 112 at the point in time $t_k$ based on the location information of the moving object 120 at the point in time $t_k$ estimated in operation 440.

In operation 460, the location measuring device 110 may estimate a location of the moving object 120 at the point in time $t_k$ through a predetermined location measuring module included in the location measuring device 110, based on the distance information $\hat{d}_{t_k}^1$, $\hat{d}_{t_k}^2$, and $d_{t_k}^3$. In this instance, the $\hat{d}_{t_k}^1$ is the distance information of the distance between the moving object 120 and the ultrasound transmitting unit (1) 111 at the point in time $t_k$ estimated in operation 430, the $\hat{d}_{t_k}^2$ is the distance information of the distance between the moving object 120 and the ultrasound transmitting unit (2) 112 at the point in time $t_k$ estimated in operation 450, and the $d_{t_k}^3$ is the distance information of the distance between the moving object 120 and the ultrasound transmitting unit (3) 113 at the point in time $t_k$ and is received from the moving object 120 at the point in time $t_k$.

In this instance, the location measuring device 110 may estimate the location of the moving object 120 at the point in time $t_k$ by using triangulation based on the $\hat{d}_{t_k}^1$, $\hat{d}_{t_k}^2$, and $d_{t_k}^3$.

Various example embodiments describing an operation of the location measuring device 110 have been described according to example embodiments with reference to FIGS. 2 through 4.

The location measuring device 110 according to an aspect of an example embodiment may estimate the location of the moving object 120 by using the triangulation based on distance information of distances between the moving object at a synchronized point in time and a plurality of ultrasound transmitting units 111, 112, 113, 114, 115, and 116, or may estimate the location of the moving object 120 by using an estimation engine such as a Kalman filter.

Also, the location measuring device 110 according to an aspect of an example embodiment may generally utilize a range of a single ultrasound reception module, and a location recognition range is expanded, and thus, when a same number of ultrasound reception modules are used, an ultrasound reception range of the location measuring device 110 may be sufficiently expanded as compared with a configuration where at least two ultrasound reception modules are included.

Figure 5:
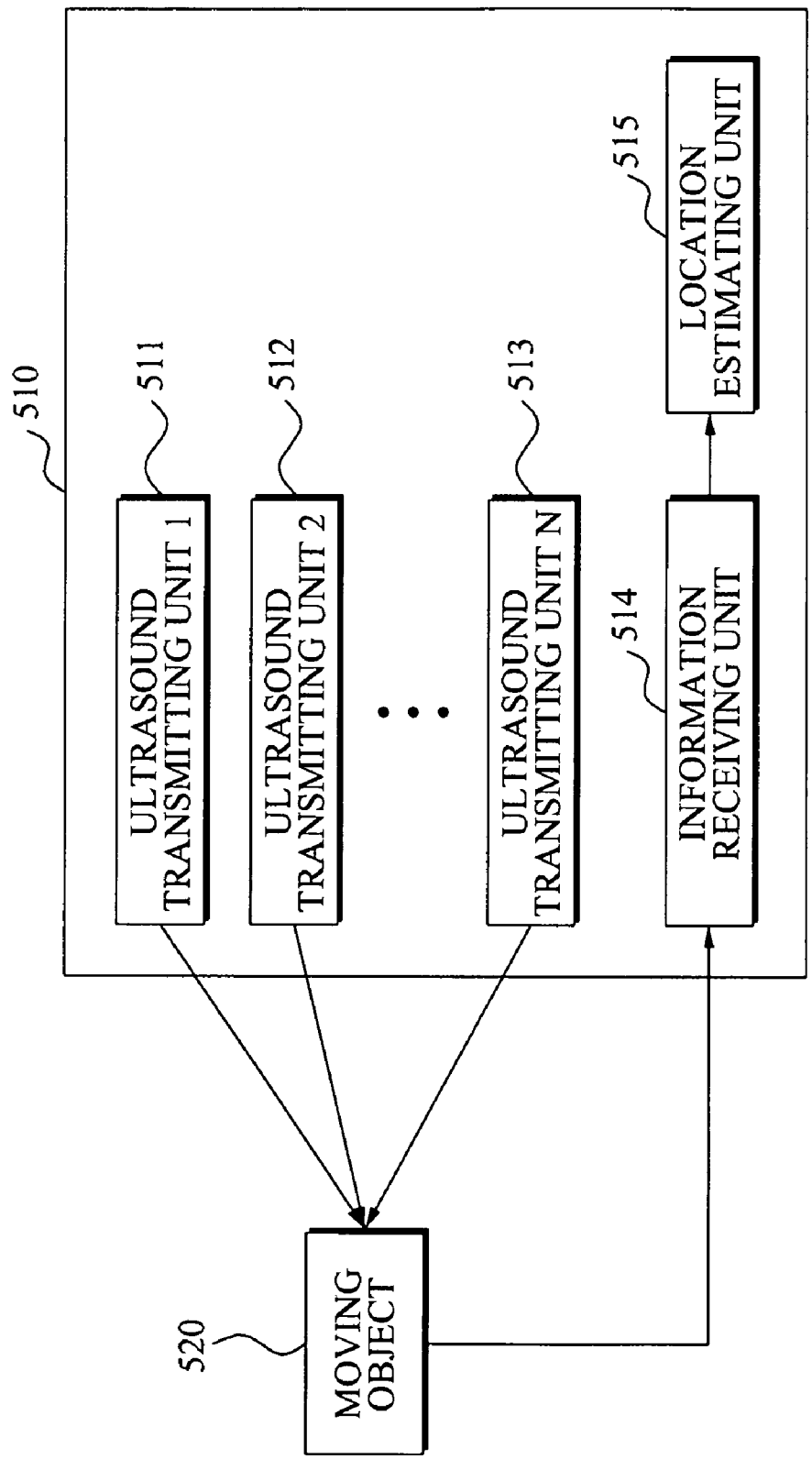
FIG. 5 is a diagram illustrating a configuration of a location measuring device according to example embodiments of the present invention.

FIG. 5 is a diagram illustrating a configuration of a location measuring device 510 according to example embodiments of the present invention.

Referring to FIG. 5, the location measuring device 510 and a moving object 520 are illustrated.

The location measuring device 510 according to an aspect of an example embodiment may include a plurality of ultrasound transmitting units 511, 512, and 513, and an information receiving unit 514, and a location estimating unit 515.

The moving object 520 may include an inertial sensor that senses a movement of the moving object 520, and may generate inertia information related to the movement of the moving object 520.

In this instance, the moving object 520 may include an acceleration sensor, a gyro sensor, or a terrestrial magnetism sensor, and the like.

The plurality of ultrasound transmitting units 511, 512, and 513 may sequentially transmit ultrasound waves to the moving object 520.

In this instance, the moving object 520 may receive the ultrasound waves sequentially transmitted from the plurality of ultrasound transmitting units 511, 512, and 513, and may generate a plurality of distance information of distances between the moving object 520 and the plurality of ultrasound transmitting units 511, 512, and 513 based on the received ultrasound waves.

The information receiving unit 514 may receive the inertia information from the moving object 520.

Also, the information receiving unit 514 may receive the plurality of distance information transmitted from the moving object 520.

The location estimating unit 515 may estimate a location of the moving object 520 at a current point in time based on inertia information and location information of the moving object 520 at a point prior to the current point in time.

In this instance, the current point in time may indicate a point in time where a last ultrasound signal is transmitted from the plurality of ultrasound transmitting units 511, 512, and 513.

In this instance, according to an aspect of an example embodiment, the location estimating unit 515 may convert distance information of distances between the moving object 520 and ultrasound transmitting units that transmitted the ultrasound prior to the current time among the plurality of distance information, into distance information of distances at the current time based on the inertia information and the location information of the moving object 520 at the time prior to the current time.

In this instance, according to an aspect of an example embodiment, the location estimating unit 515 may estimate location information of the moving object 520 at the current time based on the inertial information and the location information of the moving object 520 at the point prior to the current time, and may convert the distance information of the distances between the moving object 520 and the ultrasound transmitting units that transmitted the ultrasound prior to the current time, into the distance information at the current time by using the estimated location information of the moving object 520 at the current time.

In this instance, the location estimating unit 515 may estimate a location of the moving object 520 at the current time by using the converted distance information and distance information of a distance between the moving object 520 and an ultrasound transmitting unit that transmits the ultrasound at the current time.

In this instance, according to an aspect of an example embodiment, the location estimating unit 515 may estimate the location of the moving object at the current time by using triangulation.

According to an aspect of other example embodiments, the location estimating unit 515 may generate distance information of distances between the moving object 520 at the current time and predetermined virtual ultrasound transmitting units based on the inertia information and the location information of the moving object 520 at the point prior to the current time.

Then, the location estimating unit 515 may estimate the location of the moving object 520 at the current time by using the generated distance information and the distance information of the distance between the moving object 520 and the ultrasound transmitting unit that transmits the ultrasound at the current time.

Also, according to an aspect of an example embodiment, when the moving object 520 receives the ultrasound through at least two ultrasound receiving units, the location estimating unit 515 may estimate the location of the moving object 520 in consideration of a location relationship between the at least two ultrasound receiving units.

Figure 6:
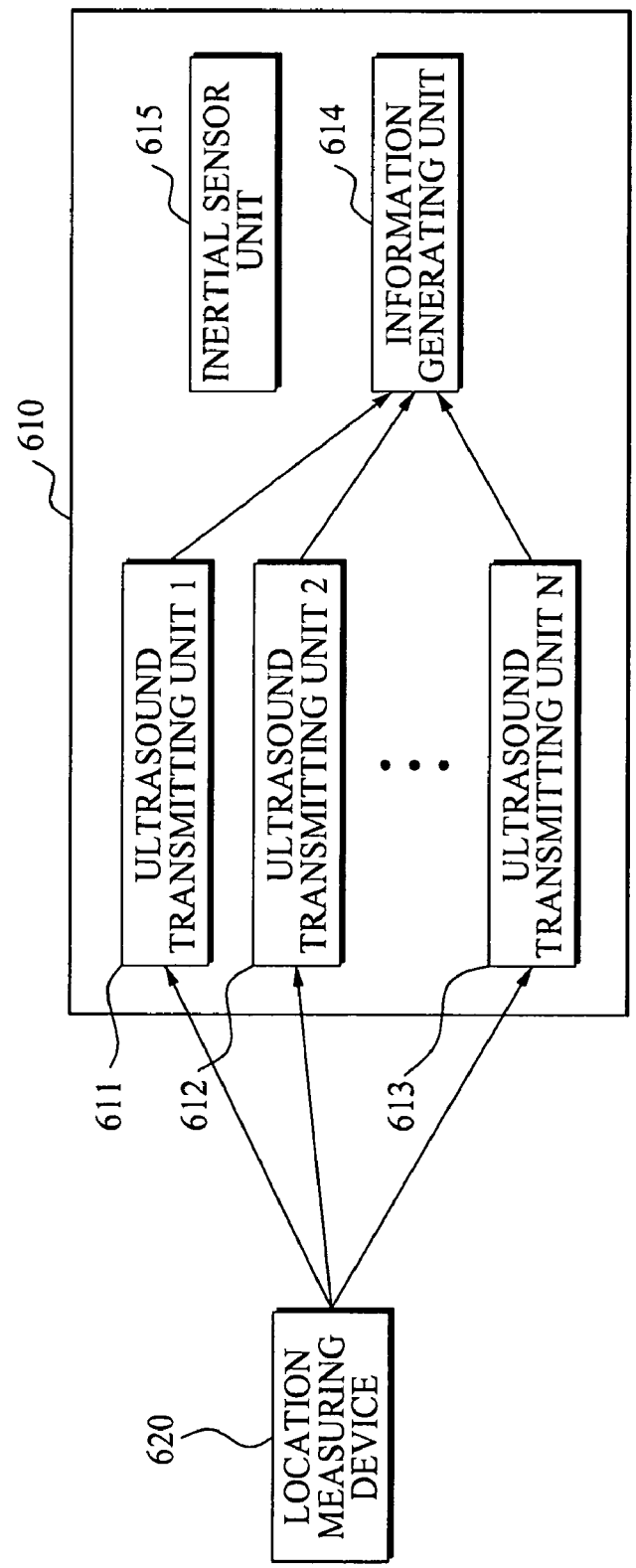
FIG. 6 is a diagram illustrating a configuration of a moving object according to example embodiments of the present invention.

FIG. 6 is a diagram illustrating a configuration of a moving object 610 according to example embodiments.

Referring to FIG. 6, the moving object 610 and a location measuring device 620 are illustrated.

The moving object 610 according to an aspect of an example embodiment may include at least one ultrasound transmitting unit 611, 612, and 613, an information generating unit 614, and an inertial sensor unit 615.

The at least one ultrasound transmitting unit 611, 612, and 613 may receive ultrasound sequentially transmitted from a plurality of ultrasound transmitting units included in a location measuring device 620.

In this instance, a number of the at least one ultrasound receiving unit 611, 612, and 613 may be one or more than one.

The information generating unit 614 may generate a plurality of distance information including distances between the moving object 610 and the plurality of ultrasound transmitting units 611, 612 and 613 based on the received ultrasound.

The inertial sensor unit 615 may generate inertia information related to a movement of the moving object 610.

In this instance, the inertial sensor unit 615 may include an acceleration sensor, a gyro sensor, a terrestrial magnetism sensor, and the like.

According to an aspect of an example embodiment, the moving object 610 may further include an information transmitting unit.

The information transmitting unit may transmit the inertial information and the plurality distance information to the location measuring device 620.

In this instance, the location measuring device 620 may receive the inertia information from the moving object 610, and may estimate a location of the moving object 610 at a current time based on the inertia information and the location information of the moving object 610 at the current time.

In this instance, according to an aspect of an example embodiment, the current time may be a time where a last ultrasound is transmitted from the plurality of ultrasound transmitting units.

In this instance, the location measuring device 620 may receive the plurality of distance information transmitted from the moving object 610, and may convert distance information of distances between the moving object 610 and ultrasound transmitting units that transmitted the ultrasound prior to the current time among the plurality of distance information, into distance information at the current time based on the inertia information and the location information of the moving object 610 at a time prior to the current time.

Then, the location measuring device 620 may estimate the location of the moving object 610 at the current time by using the converted distance information and distance information of a distance between the moving object 610 and an ultrasound transmitting unit that transmits the ultrasound at the current time.

That is, when the moving object 610 generates and transmits the inertia information and the plurality of distance information to the location measuring device 620, the location measuring device 620 may estimate the location of the moving object 610 at the current time based on the inertia information and the plurality of distance information.

However, according to an aspect of still other example embodiments of the present invention, the moving object 610 may estimate the location of the moving object 610 at the current time based on the inertia information and the plurality of distance information, and may transmit the estimated location to the location measuring device 620.

With respect to the above description, according to still other example embodiments, the moving object 610 may further include a location estimating unit and an information transmitting unit.

The location estimating unit may estimate the location of the moving object 610 at the current time based on the inertia information and the location information of the moving object 610 at the point prior to the current time.

In this instance, the location estimating unit may convert distance information of distances between the moving object 610 and the ultrasound transmitting units that transmitted the ultrasound at the time prior to the current time among the plurality of distance information, into distance information of the current time based on the inertia information and the location information of the moving object 610 at the time prior to the current time.

Also, the location measuring unit may estimate the location of the moving object 610 at the current time by using the converted distance information and the distance information of the distance between the moving object 610 and the ultrasound transmitting unit that transmits the ultrasound at the current time.

Figure 7:
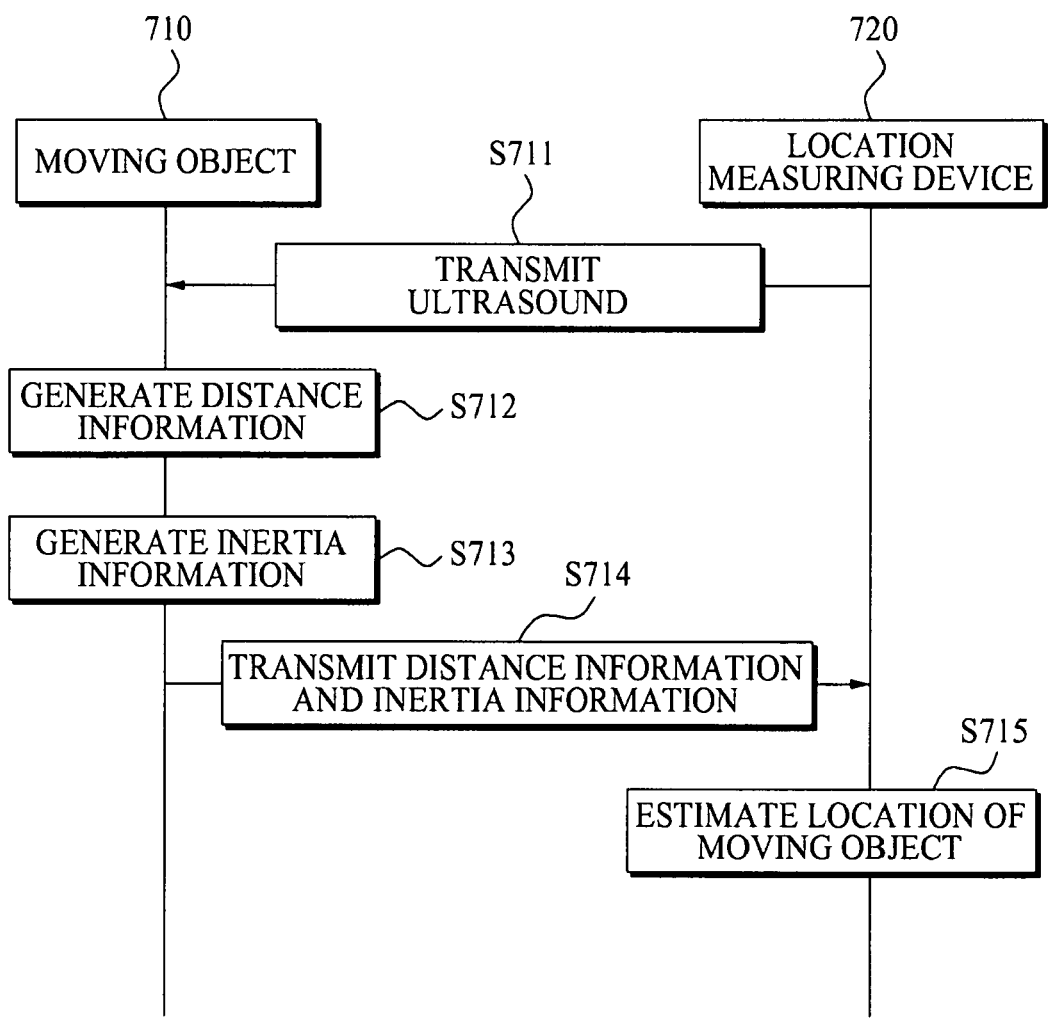
FIG. 7 is a flowchart illustrating an operation of a location measuring device and a moving object according to example embodiments of the present invention.

FIG. 7 is a flowchart illustrating an operation of a location measuring device 720 and a moving object 710 according to example embodiments.

Referring to FIG. 7, the moving object 710 and the location measuring device 720 are illustrated.

In operation S711, the location measuring device 720 sequentially transmits ultrasound signals to the moving object 710 by using a plurality of ultrasound transmitting units.

In operation S712, the moving object 710 receives the ultrasound transmitted from the location measuring device 720 and measures a distance between the moving object 710 and the plurality of ultrasound transmitting units based on the received ultrasound.

In operation S713, the moving object 710 generates inertia information related to a movement of the moving object 710 by using an inertial sensor included in the moving object 710.

In operation S714, the moving object 710 transmits, to the location measuring device 720, the inertia information and the distance information of distances between the moving object 710 and the plurality of ultrasound transmitting units.

In operation S715, the location measuring device 720 estimates a location of the moving object 710 at a current time based on the inertia information and the distance information.

The operation of the moving object 710 and the location measuring device 720 has been described with reference to FIG. 7. Here, detailed operational methods of the location measuring device 720 and the moving object 710 have been described with reference to FIGS. 1 through 6 in detail, and thus, more detailed description thereof will be omitted.

Figure 8:
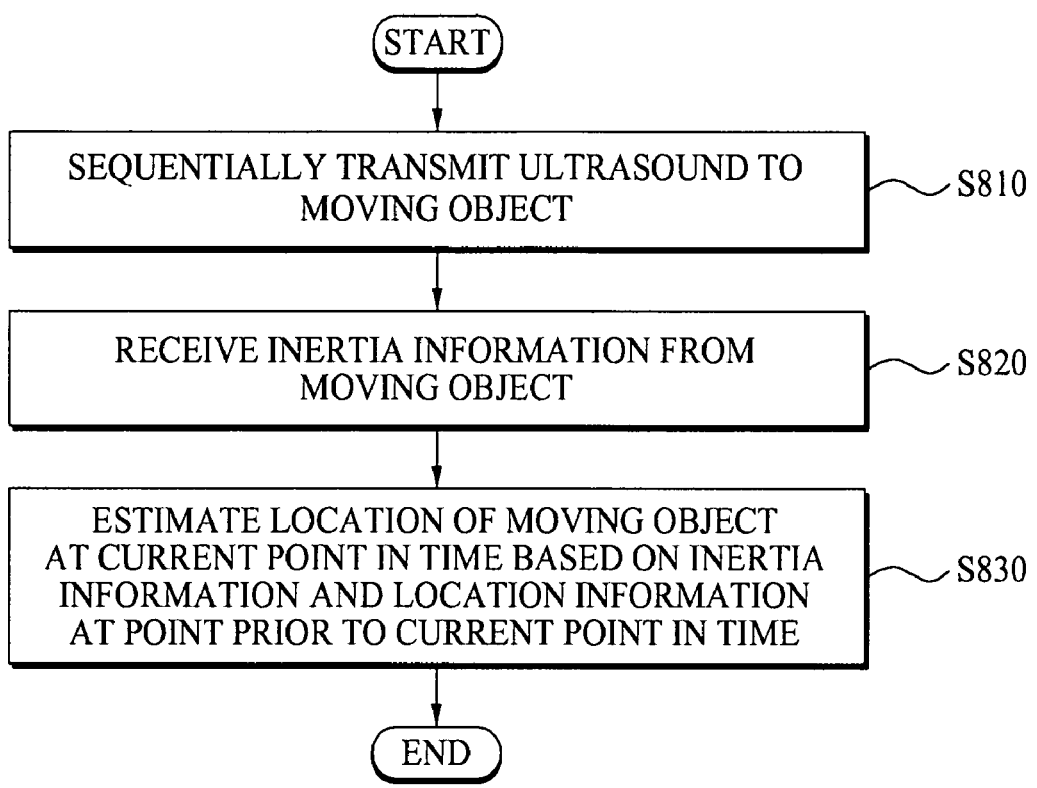
FIG. 8 is a flowchart illustrating a location measuring method according to example embodiments of the present invention.

FIG. 8 is a flowchart illustrating a location measuring method according to example embodiments.

In operation S810, ultrasound is sequentially transmitted to a moving object by using a plurality of ultrasound transmitting units.

In this instance, the moving object may receive the ultrasound sequentially transmitted from the plurality of ultrasound transmitting units, and may generate a plurality of distance information of distances between the moving object and the plurality of ultrasound transmitting units based on the received ultrasound.

In operation S820, inertia information related to a movement of the moving object is received from the moving object.

According to an aspect to an example embodiment, the moving object may include an inertial sensor generating the inertia information.

Also, the location measuring method according to an aspect of an example embodiment may further include receiving of the plurality of distance information transmitted from the moving object after operation S820.

In operation S830, a location of the moving object at the current time is estimated based on the inertia information and the location information of the moving object at a point prior to the current time.

In this instance, the current time may indicate a time where a last ultrasound signal is transmitted from the plurality of ultrasound transmitting units.

In this instance, according to an aspect of the example embodiments, operation S830 may further include converting of distance information of distances between the moving object and ultrasound transmitting units that transmitted the ultrasound at a time prior to the current time among the plurality of distance information, into distance information at the current time based on the inertia information and the location information of the moving object at the time prior to the current time.

Also, operation S830 may further include estimating of a location of the moving object at the current time by using the converted distance information and distance information of a distance between the moving object and an ultrasound transmitting unit that transmits ultrasound at the current time.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Example embodiments perform, based on an inertial navigation, a time synchronization that converts distance information of distances between a moving object and ultrasound transmitting units at a time prior to a current point in time, into distance information at the current time, thereby accurately measuring a location of a moving object at the current time.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A location measuring device, comprising:
a plurality of ultrasound transmitting units to sequentially transmit ultrasound signals to a moving object;
an information receiving unit to receive, from the moving object, inertia information related to a movement of the moving object; and
a location estimating unit to estimate a location of the moving object at a current time based on the inertia information and location information of the moving object at a time prior to the current time,
wherein the moving object includes an inertia sensor that generates the inertia information, receives the ultrasound signals sequentially transmitted from the plurality of ultrasound transmitting units, and generates a plurality of distance information of distances between the moving object and the plurality of ultrasound transmitting units based on the received ultrasound signals;
the information receiving unit receives the plurality of distance information transmitted from the moving object; and
the location estimating unit converts the distance information of distances between the moving object and the ultrasound transmitting units that transmitted ultrasound signals prior to the current time, into distance information at the current time based on the inertia information and the location information of the moving object at the time prior to the current time, and estimates the location of the moving object at the current time based on the converted distance information and distance information of a distance between the moving object and the one of the ultrasound transmitting units that transmits the ultrasound signal at the current time.

2. The device of claim 1, wherein the current time is a time at which a last one of the ultrasound signals that is transmitted from the plurality of ultrasound transmitting units is received.

3. The device of claim 1, wherein the location estimating unit estimates the location of the moving object at the current time by using triangulation.

4. The device of claim 1, wherein the location estimating unit estimates location information of the moving object at the current time based on the inertia information and the location information of the moving object at the time prior to the current time, and converts distance information of distances between the moving object and the ultrasound transmitting units that transmitted the ultrasound signals prior to the current time, into distance information at the current time based on the estimated location information of the moving object at the current time.

5. The device of claim 1, wherein the inertia sensor is at least one of an acceleration sensor, a gyro sensor, and a terrestrial magnetism sensor.

6. The device of claim 1, further comprising a plurality of ultrasound receiving units, wherein the location estimating unit estimates the location of the moving object based on a location relationship between at least two of the ultrasound receiving units, when the ultrasound is received through the at least two ultrasound signal receiving units.

7. A moving object, comprising:
at least one ultrasound receiving unit to receive ultrasound signals sequentially transmitted from a plurality of ultrasound transmitting units included in a location measuring device;
an inertia sensor unit to generate inertia information related to a movement of the moving object;
an information generating unit to generate a plurality of distance information of distances between the moving object and the plurality of ultrasound transmitting units based on the received ultrasound; and
a location estimating unit to estimate a location of the moving object at a current time based on the inertia information and location information of the moving object at a time prior to the current time,
wherein the location estimating unit converts the distance information of distances between the moving object and the ultrasound transmitting units that transmitted ultrasound signals prior to the current time, into distance information at the current time based on the inertia information and the location information of the moving object at the time prior to the current time, and estimates the location of the moving object at the current time based on the converted distance information and distance information of a distance between the moving object and the one of the ultrasound transmitting units that transmits the ultrasound signal at the current time.

8. The moving object of claim 7, further comprising:
an information transmitting unit to transmit the inertia information and the plurality of distance information to the location measuring device.

9. The moving object of claim 8, wherein the location measuring device receives the inertia information from the moving object, and estimates a location of the moving object at a current time based on the inertia information and location information of the moving object at a time prior to the current point in time.

10. The moving object of claim 9, wherein:
the current time is a time at which a last one of the ultrasound signals is transmitted from the plurality of ultrasound transmitting units; and
the location measuring device receives the plurality of distance information transmitted from the moving object, converts the distance information of distances between the moving object and ultrasound transmitting units transmitted prior to the current time, into distance information at the current time based on the inertia information and the location information of the moving object at the time prior to the current time, and estimates a location of the moving object at the current time based on the converted distance information and the distance information of a distance between the moving object and an ultrasound transmitting unit that transmits the ultrasound at the current time.

11. The device of claim 7, further comprising:
a location estimating unit to estimate the location of the moving object at the current time based on the inertia information and the location information of the moving object prior to the current time; and
an information transmitting unit to transmit the estimated location information related to the location of the moving object to the location measuring device.

12. The moving object of claim 11, wherein:
the current time is a point at which a last one of the ultrasounds signals is transmitted from the plurality of ultrasound transmitting units; and
the location measuring unit converts distance information of distances between the moving object and ultrasound transmitting units that transmitted ultrasound prior to the current time, into distance information at the current time based on the inertia information and the location information of the moving object at the time prior to the current time, and estimates a location of the moving object at the current time based on the converted distance information and the distance information of a distance between the moving object and an ultrasound transmitting unit that transmits the ultrasound signal at the current time.

13. The moving object of claim 7, wherein the inertia sensor unit includes at least one of an acceleration sensor, a gyro sensor, and a terrestrial magnetism sensor.

14. A method of measuring a location, comprising:
sequentially transmitting an ultrasound to a moving object by using a plurality of ultrasound transmitting unit;
receiving, from the moving object, inertia information related to a movement of the moving object;
estimating a location of the moving object at a current time based on the inertia information and location information of the moving object at a point prior to the current time;
receiving the plurality of distance information transmitted from the moving object
wherein the moving object includes an inertia sensor that generates the inertia information, receives the ultrasound sequentially transmitted from the plurality of ultrasound transmitting units, and generates a plurality of distance information of distances between the moving object and the plurality of ultrasound transmitting units based on the received ultrasound
wherein the estimating of the location of the moving object comprises:
converting distance information of distances between the moving object and ultrasound transmitting units that transmitted ultrasound signals prior to the current time among the plurality of distance information, into distance information at the current time based on the inertia information and location information of the moving object at a time prior to the current point in time; and
estimating the location of the moving object at the current time based on the converted distance information and distance information of a distance between the moving object and a ultrasound transmitting unit that transmits an ultrasound at the current time.

* * * * *

UNITED STATES PATENT AND TRADEMARK OFFICE
CERTIFICATE OF CORRECTION

PATENT NO. : 8,213,264 B2
APPLICATION NO. : 12/656024
DATED : July 3, 2012
INVENTOR(S) : Hyong Euk Lee et al.

Page 1 of 1

It is certified that error appears in the above-identified patent and that said Letters Patent is hereby corrected as shown below:

Column 16, Line 6, In Claim 11, delete "device" and insert -- moving object --, therefor.
Column 16, Line 15-16, In Claim 12, delete "ultrasounds" and insert -- ultrasound --, therefor.

Signed and Sealed this
Twentieth Day of November, 2012

David J. Kappos
*Director of the United States Patent and Trademark Office*